UNITED STATES PATENT OFFICE.

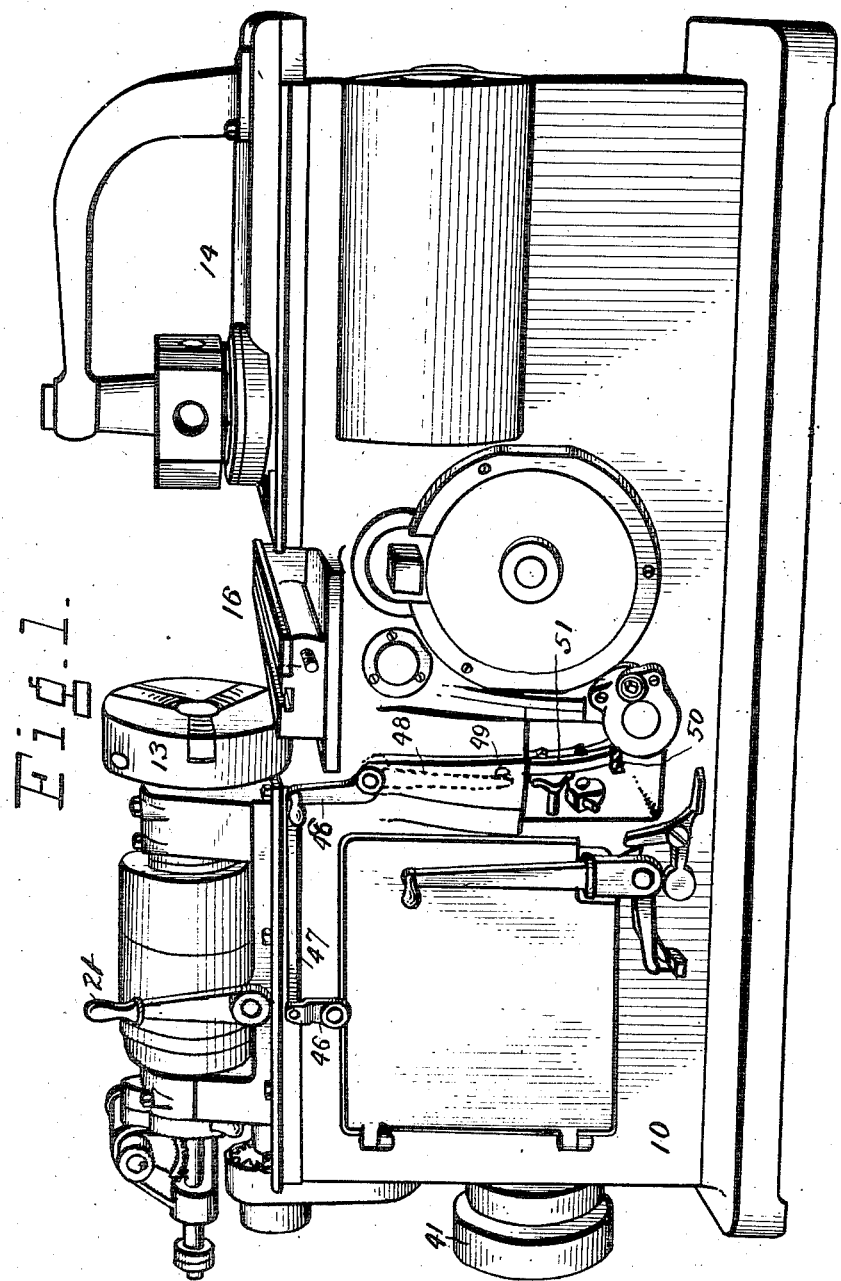

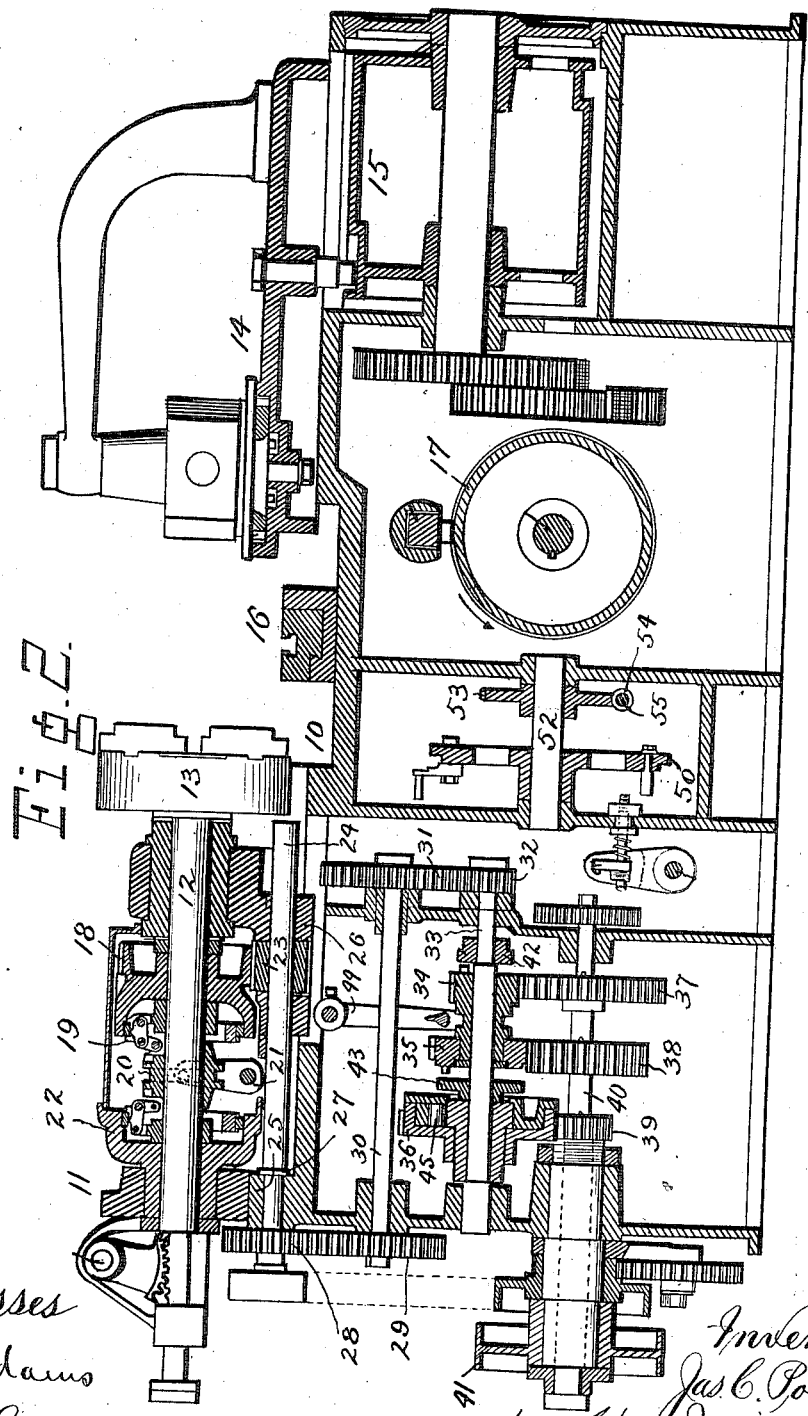

JAMES CHARLES POTTER, OF PAWTUCKET, RHODE ISLAND.

GEARING FOR LATHE-SPINDLES.

1,038,787. Specification of Letters Patent. Patented Sept. 17, 1912.

Original application filed May 12, 1909, Serial No. 495,474. Divided and this application filed February 21, 1910. Serial No. 545,199.

*To all whom it may concern:*

Be it known that I, JAMES C. POTTER, of Pawtucket, in the county of Providence, and in the State of Rhode Island, have invented a certain new and useful Improvement in Gearing for Lathe-Spindles, and do hereby declare that the following is a full, clear, and exact description thereof.

The object of my invention is more particularly to improve the construction of automatic turret lathes, although my invention is not limited to turret lathes, whereby the spindle may be controlled, both in respect to the matter of stopping its rotation, and affording variations of speed of revolution, and the accomplishment of this object by mechanism of extreme simplicity, and in the attainment of my object my invention consists in the machine having the construction and combination of parts substantially as hereinafter specified and claimed.

This application is a division of my application Serial No. 495,474, filed May 12, 1909.

In the accompanying drawing, Figure 1 is a perspective view of the head stock portion of an automatic turret lathe embodying my invention; and Fig. 2 a longitudinal section thereof.

Generally described, the machine illustrated in the drawing as an embodiment of my invention, comprises a supporting frame or bed 10, a head stock 11 having bearings at opposite ends supporting and journaling a work spindle 12, carrying a chuck 13; and a turret slide 14 which is reciprocated by a cam drum 15. Said machine is also provided with a cross slide 16 which is reciprocated by means of a cam drum 17.

Loose upon the head stock spindle is a spur gear 18, which may be clutched to or unclutched from the spindle to connect or disconnect the same with the source of power, by means of a friction clutch 19, such, for example, as that which forms the subject of Patent No. 916,195 of Potter & Johnston Machine Co., issued March 23, 1909, which is keyed or splined to the spindle, and which includes a sliding collar 20, with which is connected a hand lever 21 for clutching and unclutching the head stock spindle. In certain large machines, a second gear similar to the gear 18, but of different diameter to give a different speed, may be mounted on the head stock spindle and provided with a similar friction clutch, the two gears being arranged on opposite sides of the clutch collar, but I show in the drawings, in place of such second gear, a spindle brake or stopping device that has a construction similar to the friction clutch, excepting that the friction ring or shell 22 is stationary or fixed, instead of being rotatable, as is the case with the similar friction ring or shell of the gear. It will thus be seen that simultaneously with the unclutching of the spindle driving gear 18, to take the power from the spindle, the brake will check or arrest the revolution of the spindle, this, obviously, meaning an important saving in time, and in the operation of again clutching the spindle, there is simultaneously and incidentally performed the operation of releasing the brake.

Meshing with the spindle gear 18, is a pinion 23 keyed or splined to a horizontally extending shaft 24 supported by a bearing 25 on the frame or bed 10, and a bearing 26 on the under side of the head stock 11, the head stock bearing 26 being split or forked to receive the pinion, so that the latter may be movable on the shaft when necessary on account of the longitudinal adjustment or shifting of the head stock, the shaft being held from longitudinal movement, as by means of a collar 27 that engages one end of the bearing 25, and a gear 28 keyed to the shaft and engaging the other end of the bearing 25. The gear 28 meshes with a gear 29 beneath it, on a horizontal shaft 30 journaled in bearings in the machine frame 10, and on said shaft 30 is a second gear 31 which meshes with a pinion 32 keyed to the end of a shaft 33 journaled below and parallel with the shaft 30 in bearings in the machine frame 10. I have devised means by which the shaft 33 may be driven at any one of three different speeds to correspondingly vary the speed of the head stock spindle, because, as will be evident, the spindle, through the train of gearing that I have thus far described, is geared to said shaft 33.

Loose on the shaft 33, there are three gears 34, 35 and 36, respectively, of different diameter, which mesh, respectively, with three gears 37, 38 and 39, likewise of different diameter, keyed to the main driving shaft 40, which is mounted in bearings in the frame 10 below and parallel with the shaft 33, and is projected at one end beyond the end of the frame 10, and has fixed to it a pulley 41, which is belted to the countershaft. The gear 34 is the smallest of the three loose on the shaft 33, and serves to drive the latter at the highest speed, and on one side of which on the shaft is fixed a clutch collar 42, by which said gear 34 may be clutched to the shaft 33. The gear 35 is the one next larger in size, and it is journaled on a hub of the gear 34, and at its side opposite the gear 34 is a clutch collar 43 keyed to the shaft 33. The gears 34 and 35 are slidably mounted upon the shaft 33, so that, as by means of a lever 44 engaging a groove in the hub of the gear 34, either of the gears 34 or 35 may be placed in engagement with its clutch collar, or both disengaged therefrom. The gear 36 is journaled on the hub of an automatic clutch, which is keyed to the shaft 33, said clutch being the familiar one employing several rolls 45 situated in contracting spaces between the periphery of the clutch collar and the rim of the gear 36, so that if the clutch collar be revolved more rapidly than the gear is revolved by its driving gear 39, the two will be unclutched or freed from each other, while when the gear 36 is revolved faster than the clutch collar, the two will be clutched together, and the clutch collar and the shaft 33 will be revolved by means of the gear 36. It will be seen that when either the gear 34 or the gear 35 is clutched to the shaft 33, the shaft 33 will be revolved faster than it can be revolved by the gear 36, and therefore the gear 36 will simply turn idly, and yet automatically as a result simply of unclutching both gears 34 and 35, the shaft 33 will be clutched to the gear 36. Thus, by an exceedingly simple mechanism, and one which requires manipulation of but one lever, I am able to drive the shaft 33 at any one of three speeds, and thereby increase the range of speeds of the head stock spindle. The movement of the gears 34 and 35 to change the speeds, may be effected by hand, or automatically, and for this purpose, there is an operating crank arm 46 for the gear shifting lever 44 at the front of the machine, and connected to said crank arm by a rod or pitman 47, is an automatically operated lever 48. The latter has at one end a roller 49, in the path of a series of cam blocks 50, secured to the rim of a wheel 51, which is mounted on a horizontal shaft 52 journaled in the machine frame 10, which by its revolution brings the cam blocks in succession and at predetermined times into engagement with the lever 48, and imparts to it the movement required to cause the engagement of one gear 34 or the other 35, with their respective clutch collars, or the disengagement of both therefrom. For revolving the shaft 52, it has keyed to it a worm wheel 53 with which meshes a worm 54 on a shaft 55 that extends to the back of the machine, where it is geared to a back shaft that receives motion from the main driving shaft, all as is fully shown in my application Serial No. 495,474, filed May 12, 1909.

Having thus described my invention, what I claim is—

The combination of a spindle, a main shaft, three gears of graduated diameter on the main shaft, three spindle driving gears of graduated diameter meshing with the main shaft gears, an operative connection between said three spindle driving gears and the spindle, an automatic clutch for the largest spindle driving gear, a lever operated clutch mechanism for the two smaller spindle driving gears, and automatic means to operate said lever.

In testimony that I claim the foregoing I have hereunto set my hand.

JAMES CHARLES POTTER.

Witnesses:
 ELVERY LINGARD,
 EARLE ROBERTS.